(12) United States Patent
Buskens et al.

(10) Patent No.: US 7,990,881 B2
(45) Date of Patent: Aug. 2, 2011

(54) METHODS AND DEVICES FOR COMPUTING PATHS TO ASSURE THE INTER-DOMAIN TRANSPORT OF QOS SENSITIVE INFORMATION

(75) Inventors: Richard Wayne Buskens, Robbinsville, NJ (US); Sandra Ramos Thuel, Middletown, NJ (US); Ramesh Viswanathan, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1423 days.

(21) Appl. No.: 11/393,822

(22) Filed: Mar. 31, 2006

(65) Prior Publication Data
US 2007/0230363 A1   Oct. 4, 2007

(51) Int. Cl.
*H04J 1/16* (2006.01)

(52) U.S. Cl. ............... 370/248; 370/389; 370/351

(58) Field of Classification Search .............. 370/401, 370/402, 389, 392, 235, 238, 248, 252, 253, 370/255, 395.31, 377, 384
See application file for complete search history.

(56) References Cited

U.S. PATENT DOCUMENTS

| | | | |
|---|---|---|---|
| 6,418,476 B1 * | 7/2002 | Luciani | 709/238 |
| 6,888,837 B1 * | 5/2005 | Cunningham et al. | 370/401 |
| 2003/0016678 A1 * | 1/2003 | Maeno | 370/400 |
| 2006/0200579 A1 * | 9/2006 | Vasseur et al. | 709/238 |
| 2006/0209716 A1 * | 9/2006 | Previdi et al. | 370/254 |
| 2006/0291446 A1 * | 12/2006 | Caldwell et al. | 370/351 |

OTHER PUBLICATIONS

Y. Rekhter et al., *A Border Gateway Protocol*, rFC 1771 (BGP version 4), Mar. 1995.
J. Duffey, *Juniper Unveils 'Infranet' Council*, appearing at http://www.networkworld.com/edge/news/2004/0421juniperintra.html, Apr. 2004.
C. Labovitz et al., *Delayed Internet Routing Convergence*, in Proc. of SIGCOMM, pp. 175-187, 2000.
K. Varadhan et al., *Persistent Route Oscillations in Inter-Domain Routing*, Computer Networks (Amsterdam, Netherlands:1999), vol. 32, No. 1, pp. 1-16, 2000.
N. Feamster et al., *The Case for Separating Routing From Routers*, in Proc. of FDNA-04, 2004.
Internap home page at http://wwwinternap.com.
iBasis home page at http://www.ibasis.com.
0. Bonaventure, *Using BGP to Distribute Flexible QoS Information*, Internet Draft draft-bonaventure-bgp-qos-00.txt, Feb. 2001.
L. Xiao et al., *QoS Extension to BGP*, in Proc. of the 10th IEEE International Conference on Network Protocols (ICNP), Paris France, Nov. 2002.
R. Teixeira et al., *Characterizing and Measuring Path Diversity of Internet Topologies*, in Proc. of ACM SIGMETRICS, San Diego. CA, Jun. 2003.
D. Andersen et al., *Resilient Overlay Networks*, in Proc. 18th ACM Symposium on Operating Systems Principles, Banff, Canada, Oct. 2001.
S. Savage et al., *Detour: Informed Internet Routing and Transport*, IEEE Micro, vol. 19, No. 1, pp. 50-59, 1999.

(Continued)

*Primary Examiner* — Brenda Pham
(74) *Attorney, Agent, or Firm* — Capitol Patent & Trademark Law Firm, PLLC (57) ABSTRACT

Information can be transported over domains operated by different service providers at required Quality-of-Service (QoS) levels without disclosing inter- and/or intra-domain information to ensure that the topology of a given service provider's domain (e.g., network) is not disclosed.

23 Claims, 7 Drawing Sheets

OTHER PUBLICATIONS

Y. Amir et al., *1-800-Overlays: Using Overlay Networks to Improve VOIP Quality*, in NOSSDAV '05: Proceedings of the 15th International Workshop on Network and Operating Systems Support for Digital Audio and Video, pp. 51-56, 2005.

L. Peterson et al., *A Blueprint for Introducing Disruptive Technology Into the Internet*, in Proc. of HotNets-I, Princeton, NJ, Oct. 2002.

N. Feamster et al., *Measuring the Effects of Internet Path Faults on Reactive Routing*, in Proc. of the 2003 ACM SIGMETRICS International Conference on Measurement and Modeling of Computer Systems, pp. 126-137, 2003.

E.M. Royer et al., *Ad Hoc On-Demand Distance Vector Routing*, in Proc. of the 2nd IEEE Workshop on Mobile Computing Systems and Applications, pp. 90-110, Feb. 1999.

D.B. Johnson et al., *Dynamic Source Routing in Ad Hoc Wireless Networks*, in Mobile Computing, Imielinski and Korth, Eds. Kluwer Academic Publishers, vol. 353, 1996.

S.R. Das et al., *Performance Comparison of Two On-Demand Routing Protocols For Ad Hoc Networks*, IEEE Personal Communications Magazine special issue on Ad Hoc Networking, pp. 16-28, Feb. 2001.

A.P. Markopoulou et al., *Assessing the Quality of Voice Communications Over Internet Backbones*, IEEE/ACM Transactions on Networking, vol. 11, No. 5, pp. 747-760, 2003.

W. Jiang et al., *Assessment of VOIP Service Availability in the Current Internet*, in Passive and Active Measurement (PAM) Workshop, San Diego, CA, Apr. 2003.

P. Pan et al., *Bgrp: A Tree-Based Aggregation Protocol For Inter-Domain Reservations*, Journal of Communications and Networks, vol. 2, No. 2, pp. 157-167, 2000.

A Medina et al., *Brite: Universal Topology Generation From a User's Perspective*, in International Workshop on Modeling, Analysis, and Simulation of Computer and Telecommunications Systems, 2001.

B. Waxman, *Routing of Multipoint Connections*, IEEE Journal on Selected Areas in Communications, vol. 6, No. 9, 1988.

M. S. Kodialam et al., *Minimum Interference Routing With Applications to MPLS Traffic Engineering*, in INFOCOM (2), pp. 884-893, 2000.

\* cited by examiner

```
process kd_basic[a]
begin
  receive ann(d,(P,β,δ)) ⇒
    if a ∉ AS-set(P) and (d, P, β δ) ∉ rib-in then
    begin
      rib-in:= rib-in-(d, P) ∪ {(d, P, β,δ)}
      for each u s.t. AS-in (u)=a and {u, hd(P)} ∈ ε do
        for each v s.t. AS-in(v) = a do
          for each AS a' s.t. ∃w.AS-in(w)= a' ∧ {v,w} ∈ ε do
            send ann(d, v⊕u⊕(P,β,δ)) to a'
    end
  ||
  receive wdraw(d, P) ⇒
    if rib-in [d, P,] ≠ ∅ then
    begin
      rib-in:= rib-in-(d, P)
      for each u s.t. AS-in(u)=a and {u, hd(P)} ∈ ε do
        for each v s.t. AS-in (v) = a do
          for each AS a' s.t. ∃w.AS-in(w)= a'∧{v,w} ∈ ε do
            send wdraw(d, vuP) to a'
    end
  ||
  new destination prefix d in AS a ⇒
    for each v s.t. AS-in(v) = a do
      for each AS a' s.t. ∃ w.AS-in(w) = a' ∧ {v,w} ∈ ε do
        send ann(d, (v, band(W(v,d)), delay(W(v,d)))) to a'
  ||
  change in W(v, u) with AS-in(u) = AS-in(v) = a   ⇒
    for each (d, P, β,δ) ∈ rib-in s.t. {u, hd(P)} ∈ ε do
      for each AS a' s.t.∃ w.AS-in (w) = a' ∧ {v,w} ∈ ε do
        send ann(d, v⊕u⊕(P,β,δ)) to a'
  ||
  change in W(u, x) or addition of {u, x} to ε with AS-in(u) = a,{u, x} ∈ ε ⇒
    for each (d, P, β,δ) ∈ rib-in s.t. hd(P) = x do
      for each v s.t. AS-in(v)= a do
        for each AS a' s.t.∃ w.AS-in (w) = a' ∧ {v,w} ∈ ε do
          send ann(d, v⊕u⊕(P,β,δ)) to a'
  ||
  removal of {u, x} from ε with AS-in (u) = a ⇒
    for each (d, P, β,δ) ∈ rib-in s.t. hd(P) = x do
      for each v s.t. AS-in(v)= a do
        for each AS a' s.t.∃ w.AS-in(w) = a' ∧{v,w} ∈ ε do
          send wdraw(d, vuP) to a'
end
```

FIG. 4

```
process kd_prune [a]
begin
  receive ann(d,((P,β,δ)) ⇒
    if a ∉ AS-set(P) and (d, P, β, δ) ∉ rib-in then
    begin
      rib-in:= rib-in-(d, P) ∪ {(d, P, β,δ)}
      if ∃ w.AS-in(w)= a, {w, hd(P)} ∈ ε, best(rib-in, w, d) ≠ [rib](w,d) then
        for each v s.t. AS-in(v) = a do update-announce [v,d]
    end
  ||
  receive wdraw(d, P) ⇒
    if rib-in [d, P] ≠ ∅ then
    begin
      rib-in:= rib-in-(d, P)
      for each v s.t. ∃ β,δ, u.(d, vP,β,δ) ∈ rib ∨ (d, vuP,β,δ) ∈ rib do
        update- announce [v,d]
    end
  ||
  new destination prefix d in AS a ⇒
    for each v s.t. AS-in(v) = a do
      for each AS a' s.t. ∃ w.AS-in(w) = a' ∧ {v,w} ∈ ε do
        send ann (d, (v, band(W(v,d)), delay (W(v,d)))) to a'
  ||
  change in W(v, u) with AS-in (u) = AS-in (v) = a ⇒
    for each d s.t. rib-in[d] ≠ ∅ do update-announce [v,d]
  ||
  change in W (u, x) addition/removal of {u, x} to/from ε with AS-in(u) = a, {u, x} ∈ ε ⇒
    for each d s.t. best(rib-in, u, d) ≠ [rib](u,d) do
      for each v s.t. AS-in(v) = a do update-announce [v,d]
end update-announce [v,d]
  begin
    best_new := best(rib-in,v,d)
    if best_new ≠ [rib](v,d) then
    begin
      for each (P',β',δ') ∈ best_new \ {rib}(v,d) do
        for each a' s.t. ∃ w.AS-in (w) = a' ∧ {v,w} ∈ ε do
          send ann (d, (P',β',δ')) to a'
      for each P' ∈ ([rib](v,d))_1 \ (best_new)_1 do
        for each a' s.t. ∃ w.AS-in (w) = a' ∧ {v,w} ∈ ε do
          send wdraw (d,P') to a'
      rib := rib \ {(d,P',β',δ') ∈ rib | hd(P') = v} ∪ {(d, P',β,δ) | (P',β,δ) ∈ best_new}
    end
  end
```

FIG. 5

```
proc-request [u,T,x,d,β,δ]
begin
  if AS-in(u) ≠ a then send req (⟨T,x⟩,⟨u,d,β,δ⟩) to AS-in(u)
  elseif T∈ rt or ss[T,u] ≠ ∅ then proc-fail [x,T,u]
  elseif d is a prefix in a then
    if β ≤ B(u,d) and δ ≥ delay(W(u,d)) then
    begin
      B(u,d) := B(u,d) - β; ss := ss ∪ {⟨T,u,x,d,β⟩}
      send succ(u,⟨T,x⟩) to AS-in(x)
    end
    else send fail(u,⟨T,x⟩) to AS-in(x)
  elseif re[T,u] ≠ ∅ then
  begin
    rf-tmp := ∅
    for each v s.t. AS-in(v) = AS-in(u), v ≠ u or {u,v} ∈ ε, AS-in(v) ≠ AS-in(x) do
    begin
      δ_trans := delay(W(u,v))
      if β ≤ B(u,v) and δ ≥ δ_trans then rf-tmp := rf-tmp ∪ {⟨T,v,u,d,β,δ - δ_trans⟩}
    end
    if rf-tmp = ∅ then proc-fail [x,T,u]
    else
    begin
      re := re ∪ {⟨T,u,x,δ⟩}
      for each (T,v,u,d,β,δ') ∈ rf-tmp do
      begin
        B(u,v) := B(u,v) - β; rf-out := rf-out ∪ {⟨T,u,v,β⟩}
        proc-request [v,T,u,d,β,δ']
      end
    end
  end
  elseif or [T,u] = ∅ then
    if δ > re-del then or := or ∪ {⟨T,u,x,d,β,δ⟩} else proc-fail [x,T,u]
    else
    begin
      ⟨y,d,β',δ'⟩ := or [T, u]
      If δ > δ' then
      begin
        or := or \ {⟨T,u,y,d,β',δ'⟩} ∪ {⟨T,u,x,d,β,δ⟩}
        proc-fail [y,T,u]
      end
      else proc-fail [x,T,u]
    end
```

FIG. 6

```
proc-success [u,T,v]
if AS-in (u) ≠ a then send succ (v,(T,u)) to AS-in(u)
else
begin
  ⟨x,δ⟩ := re [T,u]
  re := re \ {(T,u,x,δ)}
  β := rf-out [T,u,v]
  rf-out := rf-out {(T,u,v,β)}
  ss := ss ∪ {(T,u,x,v,β)}
  proc-success [x,T,u]
  for each (w,β') ∈ rf-out [T,u] do
  begin
    rf-out := rf-out \ {(T,u,w, β')}
    B(u,w) := B(u,w) + β'
    proc-release [w,T,u]
  end
  if or [T,u] ≠ 0 then
  begin
    (y,d,β,δ') := or [T,u]
    or := or \ {(T,u,y,d,β',δ')}
    proc-fail [y,T,u]
  end
end proc-fail [u,T,v]
if AS-in (u) ≠ a then send fail (v,(T,u)) to AS-in (u)
else
begin
  β := rf-out [T,u,v]
  B(u,v) := B(u,v) + β
  rf-out := rf-out \ {(T,u,v, β)}
  if rf-out [T,u] ≠ 0 then
  begin
    ⟨x,δ⟩ := re [T,u]
    re := re \ {(T,u,x,δ')}
    proc-fail [x,T,u]
    if or [T,u] ≠ 0 then
    begin
      (y,d,β',δ') = or [T,u]
      or := or \ {(T,u,y,d,β',δ')}
      proc-request [u,T,d,y,β',δ']
    end
  end
end
```

FIG. 7

```
proc-release [u,T,x]
begin
  If AS-in(u) ≠ a then send release(⟨T,x⟩,u) to AS-in(u)
  elseif re[T,u,x] ≠ ∅ then
  begin
    for each ⟨v,β⟩ ∈ rf-out[T,u] do
    begin
      B(u,v) := B(u,v) + β
      rf-out := rf-out \ ⟨T,u,v,β⟩
      proc-release [v,T,u]
    end
    δ := re[T,u,x]; re := re\⟨T,u,x,δ⟩
    if or[T,u] ≠ ∅ then
    begin
      ⟨y,d,β',δ'⟩ := or [T,u]
      or := or\{⟨T,u,y,d, β',δ'⟩}
      proc-fail [y,T,u]
    end
  end
  elseif or[T,u,x] ≠ ∅ then
  begin
    ⟨d,β',δ'⟩ := or [T,u,x]
    or := or\{⟨T,u,x,d,β',δ'⟩}
  end
  elseif ss [T,u,x] ≠ ∅ then
  begin
    ⟨v,β⟩ := ss[T,u,x]
    ss := ss \ ⟨T,u,x,v,β⟩
    B(u,v) := B(u,v) + β
    proc-release [v,T,u]
  end
end
proc-reserve[u,T]
if AS-in(u) ≠ a then send reserve (T,u) to AS-in(u)
else
begin
  ⟨x,v,β⟩ := ss[T,u,]
  ss := ss\{⟨T,u,x,v,β⟩}
  W(u,v) := (⟨Wu,(u,v)⟩₁ - β, ⟨W(u,v)⟩₂)
  setup-LSP (T,x,u,v,β)
  rt:=rt ∪ {T}
  proc-reserve [v,T,]
end
```

METHODS AND DEVICES FOR COMPUTING PATHS TO ASSURE THE INTER-DOMAIN TRANSPORT OF QOS SENSITIVE INFORMATION

RELATED APPLICATION

The present application is related to co-pending U.S. patent application Ser. No. 11/393,884, entitled "Architectures For Assuring the Inter-Domain Transport of QoS Sensitive Information" the disclosure of which is incorporated by reference herein in full as if set forth in full herein.

BACKGROUND OF THE INVENTION

Assuring that information is transported from one point to another with a certain quality-of-service ("QoS"), especially when the points are located in different domains (i.e., inter-domain) operated by different service providers, is important to the success of existing services as well as to enable the spread and growth of relatively new services, such as voice-over-Internet protocol ("VoIP"), multimedia and mission-critical services.

While the transport of information within a single domain (i.e., intra-domain) at certain guaranteed QoS levels has been the subject of considerable research for over a decade, little research has been done on the transport of information at certain guaranteed QoS levels in the inter-domain setting.

The transport of information over different domains involves issues that are not present in the intra-domain setting. For example, typically a service provider operating one domain (sometimes referred to as an "Autonomous System or "AS") requires that its internal topology (e.g., path segments, links) be kept secret from all other service providers. Hereafter, we will use the terms "domains", "AS", and "network" to mean the same thing, that is, the physical infrastructure that is built, operated and maintained most often by a single service provider (e.g., Verizon).

Accordingly, it is desirable to provide methods and devices that enable the transport of information between different domains while assuring QoS levels and maintaining intra-domain, topological secrecy.

SUMMARY OF THE INVENTION

The present inventors have discovered ways to allow information to be transported over multiple, different domains while assuring QoS levels and maintaining topological secrecy.

In accordance with one embodiment of the invention, a first set of methods and devices, referred as "KD-AQUA" (an abbreviation for Knowledge Driven-Assured Quality) includes methods and devices that, first, accurately maintain an information base of routes. The maintenance of an accurate information base is important to assure that the proper routes are identified and the necessary bandwidth and delay requirements are met (i.e., QoS assurance). In a second aspect of the invention, the information base is consulted in order to route information between different domains without the need for a service provider to disclose internal, intra-domain paths or links. The information base stores the "best" paths from a reference domain (i.e., the domain where the information base is stored) to a particular destination as well as the best paths from domains neighboring the reference domain to the destination. The QoS parameters (e.g., bandwidth and delay) of each best path are also stored. By only storing best paths, storage requirements are reduced. Best paths may be determined using any number of methodologies, including the use of a configurable cost metric that is a function of a particular path and its quality. When a so-called "trunk request" is received by the reference domain, the information base is consulted and used to reserve bandwidth between the reference domain and a destination included in the trunk request along a path which meets the QoS requirements contained in the trunk request.

In accordance with a further embodiment of the present invention, an "announcement" message, which includes a destination prefix, QoS parameters and the best path information related to a destination indicated by the prefix, may be received by a reference domain. More specifically, the announcement message may be received by a device which is known as a "speaker" within the reference domain. The speaker may comprise a router or the like and may include the information base, or, alternatively have access to it when the base is not a part of the speaker. The speaker processes the announcement message in order to determine whether a path or path segment (collectively "path" unless otherwise noted) in the path information traverses the reference domain, or if the path is already stored in a first section of an information base known as a "first, best path listing". This first path listing comprises those best paths from neighboring domains to the destination contained in the received message along with their associated QoS parameters.

If the path contained in the message is not already stored in the first, best path listing or if the path does not traverse the reference domain then the path is added to the information base, in particular to the first, best path listing. In this manner, the information base is continuously updated with the best path(s) to a given destination from neighboring domains. The result is that a highly accurate information base is created and maintained.

In a further embodiment of the present invention, the received, best path information is also used to compute one or more new best paths from the reference domain itself to the destination indicated by the destination prefix in the received announcement message along with associated QoS parameters. Once these one or more new best paths and parameters are computed they are added to a second section of the information base, referred to as a "second, best path listing". This second, best path listing comprises those best paths from the reference domain to the destination contained in the announcement message as well as the best paths to a plurality of other destinations along with the associated QoS parameters.

In yet an additional embodiment of the present invention, one or more different types of messages (e.g., announcement messages, withdrawal messages) are sent after the second, best path listing has been updated with new best paths. These messages are sent from the reference domain to its neighboring domains in order to provide the neighboring domains with new updated paths from the reference domain to the destination. The messages comprise inter-domain path information, not intra-domain information, thereby ensuring that a service provider's internal topological infrastructure remains secret.

For example, a message may comprise path segments that are described by a sequence of border routers that are a part of a "peering link" (e.g., a link between a border router in one domain to a border router in a second, neighboring domain). Because the computed, new best path only includes border router-to-border router peering link path segments, none of the intra-domain links of the reference domain are disclosed In yet further embodiments of the present invention, a second set of methods and devices, referred to as "OD-AQUA" (an abbreviation for On Demand Assured Quality)

do not rely on information stored in an information base to select paths in order to reliably transport information between different domains. Instead, the OD-AQUA methods and devices attempt to discover and reserve a path in response to each received trunk request using on-demand techniques. The ability to reserve paths without relying upon stored information is believed to be a significant achievement. As with the KD-AQUA methods and devices (hereafter "KD-AQUA" for short), messages generated by the OD-AQUA methods and devices provided by the present invention (hereafter "OD-AQUA" for short) do not disclose intra-domain topological information. In addition, OD-AQUA ensures that no inter-domain information is disclosed (e.g., no border router peering links are disclosed) a feature that is not typically provided by KD-AQUA.

Another distinction between KD-AQUA and OD-AQUA is that although both identify available best paths, OD-AQUA ensures that the resources required to reserve such a path(s) are, in fact, reserved. Sometimes KD-AQUA is unable to do so.

Like KD-AQUA, OD-AQUA also assures that any path which is reserved in response to a trunk request also satisfies the QoS requirements of such a request.

A more specific example of how OD-AQUA may be used is as follows. Upon receiving a trunk request that comprises at least a destination prefix and QoS requirements, a speaker within a reference domain may be operable to send a path request message from the reference domain to one or more neighboring domains in order to identify one or more paths that satisfy the trunk request. In accordance with the present invention, the message does not contain intra- or inter-domain information (e.g. the border routers involved in routing such a request). Instead, the message contains the QoS requirements and the desired destination from the trunk request. Subsequently, the reference domain may receive one or more messages from the one or more neighboring domains in response to the path requests. Each message may indicate whether or not a given neighboring domain can satisfy the trunk request. In one embodiment of the present invention, the reference domain sends a so-called "reservation request" to a neighboring domain that has sent a responsive message indicating that it can satisfy the path and QoS requirements contained in the trunk request. In a second embodiment of the present invention, once the reference domain has received a message from one neighboring domain that it can satisfy a trunk request, the reference domain may be operable to send a "release message" to the other neighboring domains that have either not responded to the reference domain's path request or have responded in a negative way (i.e., they can not satisfy the trunk request). The release message provides a way for the reference domain to indicate to its neighbors that it no longer needs them to respond to its path request because it has already found at least one neighboring domain which can satisfy its path request. Neither of the messages received at, or sent from, the reference domain contain intra- or inter-domain information.

In yet a third embodiment of the present invention, the reference domain may send a so-called "trunk request can not be met" message to the domain which originated the trunk request received by the reference domain. The reference domain may send such a message when it receives messages back from all of its neighboring domains that none of them can satisfy the trunk request. Such a message provides a so-called "guaranteed" termination process of a trunk request for those requests which cannot be met. Together with the fact that OD-AQUA "guarantees" that an identified path can be reserved, these two features makes OD-AQUA a powerful tool for transporting information between domains.

The present inventors believe that the KD and OD-AQUA methods and devices provided by the present invention provide significant improvements over existing routing methodologies, such as Border Gateway Protocol ("BGP") techniques.

The embodiments described above are just some examples of the present invention which are discussed in more detail with reference to the drawings, figures and detailed description of the invention which follow.

A DETAILED DESCRIPTION OF THE INVENTION, WITH EXAMPLES

The inventors believe that the methods and devices provided by the present invention may be deployed by service providers that need to cooperate with each other in order to deliver QoS-sensitive services to their customers.

Figure 1:
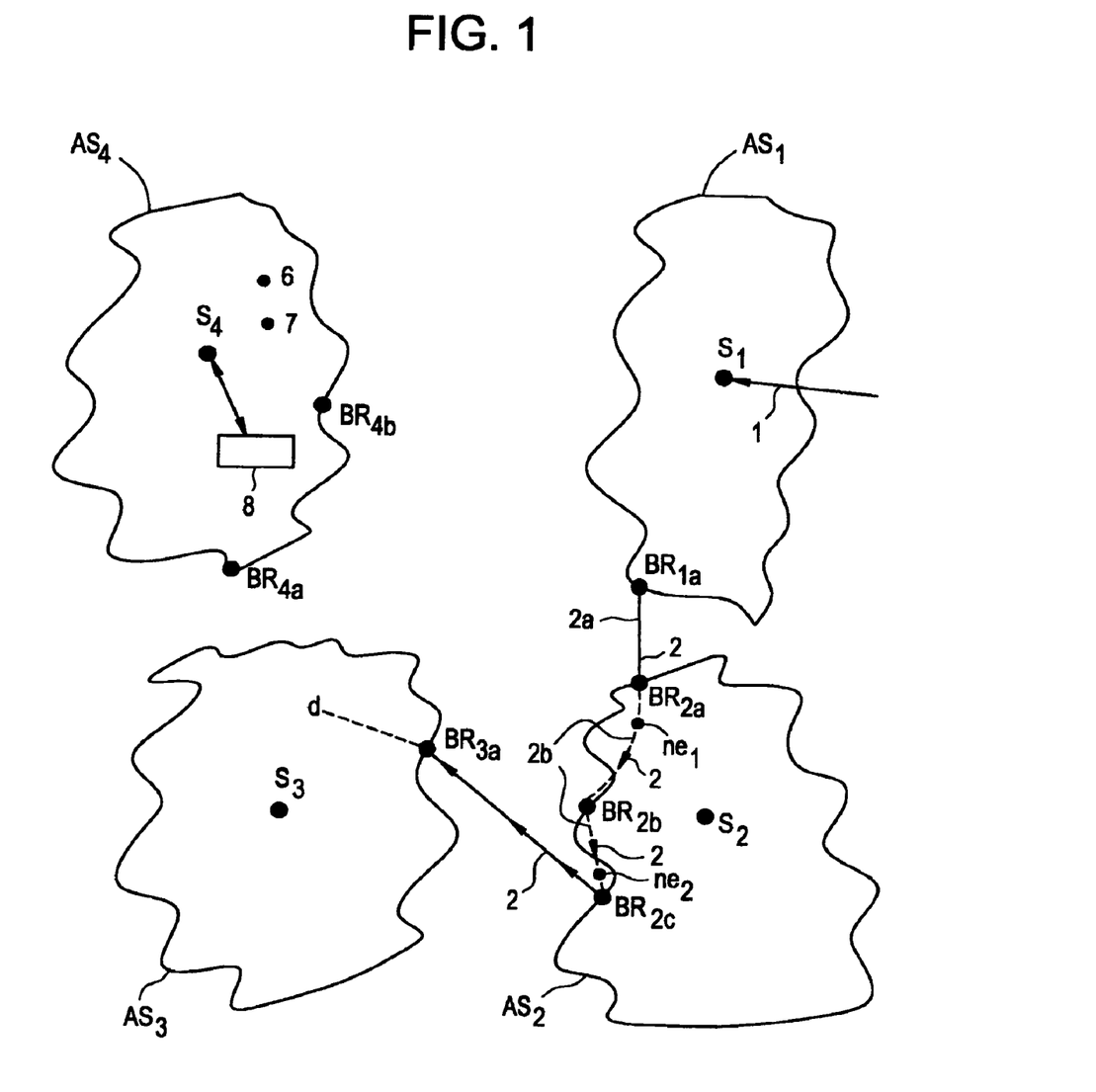
FIG. 1 depicts a simplified diagram of different domains used to illustrate embodiments of the present invention.

As briefly discussed above, each service provider will be assumed to operate a single AS or domain. Referring now to FIG. 1, there is shown different domains labeled $AS_1$, $AS_2$, $AS_3$ and $AS_4$ Within each domain there is depicted at least one speaker, labeled $S_1$, $S_2$, $S_3$ and $S_4$. To simplify the discussion which follows, domain $AS_1$ will be referred to as a "reference domain". It should be understood, however, that any one of the domains may be the reference domain, and, therefore, the discussion which follows applies equally to these domains. It should be further understood that within each domain there is typically a single speaker. Though shown as a single, separate element within each of the domains in FIG. 1, a speaker may also be a part of another component, such as a specialized border router or network management element and may be further separated into multiple components. Further, it should be understood that a speaker, and in particular the features and functions of the present invention, may be implemented in hardware, software, firmware or some combination of the three. When implemented in software or firmware, the features and functions of the present invention may be embodied as one or more applications stored on, or downloaded onto, one or more computer readable mediums (hard-drive, compact disc, memory, memory plus processor, etc.).

Also shown in FIG. 1, are Border Routers ("BR") which are associated with each AS (e.g., Border Router $BR_{1(a)}$, $BR_{1(b)}$ are associated with $AS_1$; Border Routers $BR_{2a}$, $BR_{2b}$ with $AS_2$; Border Routers $BR_{3a}$, $BR_{3b}$, with $AS_3$; and Border Routers $BR_{4a}$ and $BR_{4b}$ with $AS_4$, etc.).

We will first discuss the KD-AQUA methods and devices provided by the present invention and then turn to a discussion of the OD-AQUA methods and devices.

In accordance with one embodiment of the present invention, one KD-AQUA method provided by the present invention maintains an accurate information base of routes, within a reference domain $AS_1$.

Referring back to FIG. 1, an announcement message may be received by the reference domain $AS_1$ along pathway 1.

This message may be received by the speaker $S_1$. It should be understood that a speaker may comprise one or more different types of routers that are specifically designated to handle announcement messages and the like. The announcement message may comprise at least a destination prefix, which identifies a particular destination, best path information related to the destination and QoS parameters related to the best path information. In general, an announcement message is a way for one domain to send its neighboring domains those best paths from the domain to a particular destination that satisfies certain QoS level requirements.

Continuing, a particular best path from a domain neighboring reference domain $AS_1$ to a destination and the QoS parameters associated with the best path are contained in the message received along pathway 1. Upon receiving the announcement message, the speaker $S_1$ is operable to process the message in order to determine: (a) whether a path (i.e., best path) contained in the message traverses the reference domain; and (b) whether a path in the message is already stored in its information base. It should be understood that this initial processing is carried out in order to determine whether further processing is required. For instance, if a best path in the announcement message is already stored within the information base of the speaker $S_1$, then the speaker need not do any further processing of the message (e.g., it need not store the received best path or compute new paths). Similarly, if the received best path traverses the reference domain $AS_1$ it need not update its information base because this base is concerned with paths which do not traverse the reference domain. It should be understood that all paths which do traverse the reference domain, $AS_1$, are stored in other information bases not shown in FIG. 1. These bases are not the subject of the present invention, are well understood by those skilled in the art and a discussion of them is not necessary for an understanding of the present invention.

More particularly, in a further embodiment of the present invention, the speaker $S_1$ processes the message in order to determine whether the best path in the message is already stored in a first, best path listing. The first, best path listing contains a listing of all of the best paths from domains that neighbor the reference domain to destinations, including the destination identified by the destination prefix in the announcement message along with their associated QoS parameters. The first, best path listing is, in essence, a knowledge-base for the reference domain $AS_1$ concerning its neighboring domains. This first, best path listing ("first listing" for short) may be part of an overall information base maintained by the speaker $S_1$ on behalf of $AS_1$.

If it is determined that the best path in an announcement message is neither a part of the first path listing nor traverses the reference domain then the speaker $S_1$ is further operable to add the path information (e.g., best path and its associated QoS parameters) contained in the announcement message into the first listing. In this manner, this listing is continuously updated with new information regarding new, best paths/QoS parameters from neighboring domains to a given destination. This makes the first listing highly accurate.

In addition to having a listing that relates to neighboring domains, the $AS_1$, and in particular, speaker, $S_1$ also maintain a second, best path listing ("second listing" for short) which relates to the reference domain itself. In particular, this second listing consists of: (a) those best paths from the reference domain to a plurality of destinations, including the destination indicated by the destination prefix in the announcement message received via pathway 1; and (b) the QoS parameters associated with the best paths in (a). The second listing may be part of the same overall information base as the first listing.

In accordance with a further embodiment of the present invention, in addition to updating the first listing using the path information contained in the message, the present invention (in particular the speaker $S_1$) is further operable to compute one or more, new best paths from the reference domain $AS_1$ to the destination identified by the destination prefix in the received announcement message along with associated QoS parameters. After one or more of these new best paths are computed, the speaker $S_1$ is operable to update the second listing by adding the computed best paths and their associated QoS parameters into the listing. In this manner, the speaker $S_1$ is able to accurately maintain both a listing of best paths from its neighboring domains to the destination contained in the message as well as a list of best paths from its own reference domain to the destination.

The process described above may be followed each time an announcement message is received by the speaker $S_1$. As such, the information base within $AS_1$ contains an accurate identification of the best paths and associated QoS parameters to a plurality of destinations.

As discussed above, the speaker $S_1$ computes new best paths. It should be understood that a "best path" may be one that optimizes QoS related characteristics, such as smallest hop count, smallest delay, greatest bandwidth, or a combination of these characteristics. In accordance with embodiments of the present invention, rather than specifying one set of characteristics/criteria, a general class of optimization criteria is specified. For example, in a further embodiment of the invention, a best path may be computed using optimization criteria that uses a cost function c to assign a real number to any QoS path. Smaller costs correspond to better paths, and optimal QoS paths are those with minimum cost. Examples of cost functions are ones that correspond to a minimum number of border routers traversed and ones that correspond to a maximum bandwidth to delay ratio.

Referring again to FIG. 1, there is shown a path 2 from Border Router, $BR_{1a}$ to Border Router $BR_{2a}$, through Border Routers $BR_{2b}$ and $BR_{2c}$ to Border Router $BR_{3a}$ to a destination, d. For illustration purposes, path 2 represents a new best path which has been computed by the speaker, $S_1$. In accordance with the present invention, it can be said then that the speaker $S_1$ computes one or more paths, such as path 2, from a border router associated with the reference domain, $AS_1$ to the destination, d. Similarly, the speaker $S_1$ is operable to compute new QoS parameters associated with the new, best path 2. These parameters may comprise delay and an available bandwidth, for example. A shown in FIG. 1, path 2 is depicted as including both solid line segments, such as segment 2a, and broken lines segments, such as segments 2b. In accordance with the present invention, only the path segments indicated as solid lines will be included in a message sent by speaker $S_1$ or another element within $AS_1$ to a neighboring domain. These are the inter-domain segments. For example, a typical message may include the sequence $BR_{1a}$, $BR_{2a}$, $BR_2$, $BR_{3a}$ and d thereby omitting the intra-domain path segments 2a and elements $BR_{2b}$, $ne_1$ and $ne_2$ ("ne" is short for "network element"). As stated before, the exclusion of intra-domain path segments assures a service provider that its internal topology will be kept secret from other service providers.

In mentioning messages generated by the speaker $S_1$ we skipped ahead a bit. As described in more detail below, messages are generated once the speaker $S_1$ has computed a new best path and updates its information base. These messages are generated and sent to neighboring domains of $AS_1$ to provide them with the new best path computed by speaker $S_1$. Upon receipt of a message from speaker $S_1$, each of the neighboring domains (i.e., their speakers) are further operable to update their own information bases accordingly. As known by those skilled in the art, and as now stated, a change in a best path from one domain to a destination may impact the best path from another domain to the same destination.

In addition to computing a new best path, the speaker $S_1$ may be further operable to compute a delay value associated with a part of the computed path which includes that segment between its Border Router $BR_{1a}$ and the Border Router $BR_{2a}$ of the next domain $AS_2$. Such a link between Border Router $BR_{1a}$ and Border Router $BR_{2a}$ is an example of a peering link. Thus, it can be said that the speaker $S_1$ is operable to compute a delay value that is associated with the segment of a computed path which comprises a peering link. Thereafter, the speaker $S_1$ may be operable to decrement or subtract the computed delay value from the original, delay valued received in the announcement message (or trunk request). The resulting delay value represents a delay requirement which must be met by all of the subsequent domains along the identified path 2. The resulting delay value will be referred to as a "next" delay value, to make the following discussion clearer. Similarly, speaker $S_1$ computes an available bandwidth value that is associated with the peering link. Thereafter, this computed value is decremented or subtracted from the original available bandwidth value contained in the announcement message to arrive at a "next" available bandwidth value. Once the next delay and next available bandwidth values are computed, these values may be sent by the speaker $S_1$, along with the computed best path and destination to the neighboring domains as described in more detail later on.

As noted above the speaker $S_1$ may send a message to its neighboring domains that contains inter-domain path segments, such as border routers. As the reader may have noted, the border routers included in the exemplary message sequence mentioned above are a part of a peering link. The lone border router $BR_{2b}$ that is not a part of a peering link was left out of the sequence. Again, this is done to assure a service provider that only inter-domain topological information will be included in a message used to identify and reserve paths through multiple domains.

The process just described illustrates an example of how a given domain may maintain an accurate information base of best paths to a destination from itself as well as from other neighboring domains. It should be understood that this information base may contain best paths to a plurality of destinations from a plurality of neighboring domains as well as the reference domain.

In addition to maintaining an accurate information base, the present invention provides for additional features and functions as well. In general, these features and functions can be divided into two topics: (a) the processing of trunk requests; and (b) the forwarding of messages from one domain (e.g., reference domain) to another.

We will first discuss those features of the present invention which relate to the processing of trunk requests and then move on to a further discussion of messages which may be generated after an information base has been updated.

Referring again to FIG. 1, there is shown a pathway 1 leading to the speaker $S_1$ within $AS_1$. In accordance with the present invention, the reference domain $AS_1$, and in particular the speaker $S_1$, may be operable to receive a trunk request along pathway 1 that comprises at least a destination prefix and QoS requirements. As is understood by those skilled in the art, a trunk request is a type of message that attempts to reserve resources (e.g., available bandwidth) along a path that runs from the source of the request to a given destination. Thus, it differs from an announcement message in that a trunk request does not contain best path information. Rather, a trunk request is a request to a domain, such as $AS_1$, to identify a best path which meets the requirements of the request. In this case, the trunk request includes a destination prefix and QoS requirements. In accordance with the present invention, upon receiving the trunk request, the speaker $S_1$ may be operable to search its information base in order to identify one or more paths to the destination associated with the destination prefix in the request which also satisfies the QoS requirements of the request. The QoS requirements may comprise a delay value and an available bandwidth value, so, any path identified by the speaker $S_1$ must satisfy the delay and available bandwidth requirements in the trunk request. Assuming that speaker $S_1$ is able to identify at least one such satisfactory path, the speaker $S_1$ may be further operable to forward a "reservation request" to each neighboring domain along the identified path between the reference domain and the destination in order to reserve bandwidth which is sufficient to satisfy the trunk request. In accordance with the present invention, for each path that satisfies the trunk request, the speaker $S_1$ may be operable to forward a separate reservation request. In essence, a reservation request acts to reserve those resources needed to transport information associated with the trunk request from the reference domain $AS_1$ to a final destination.

Figure 2:
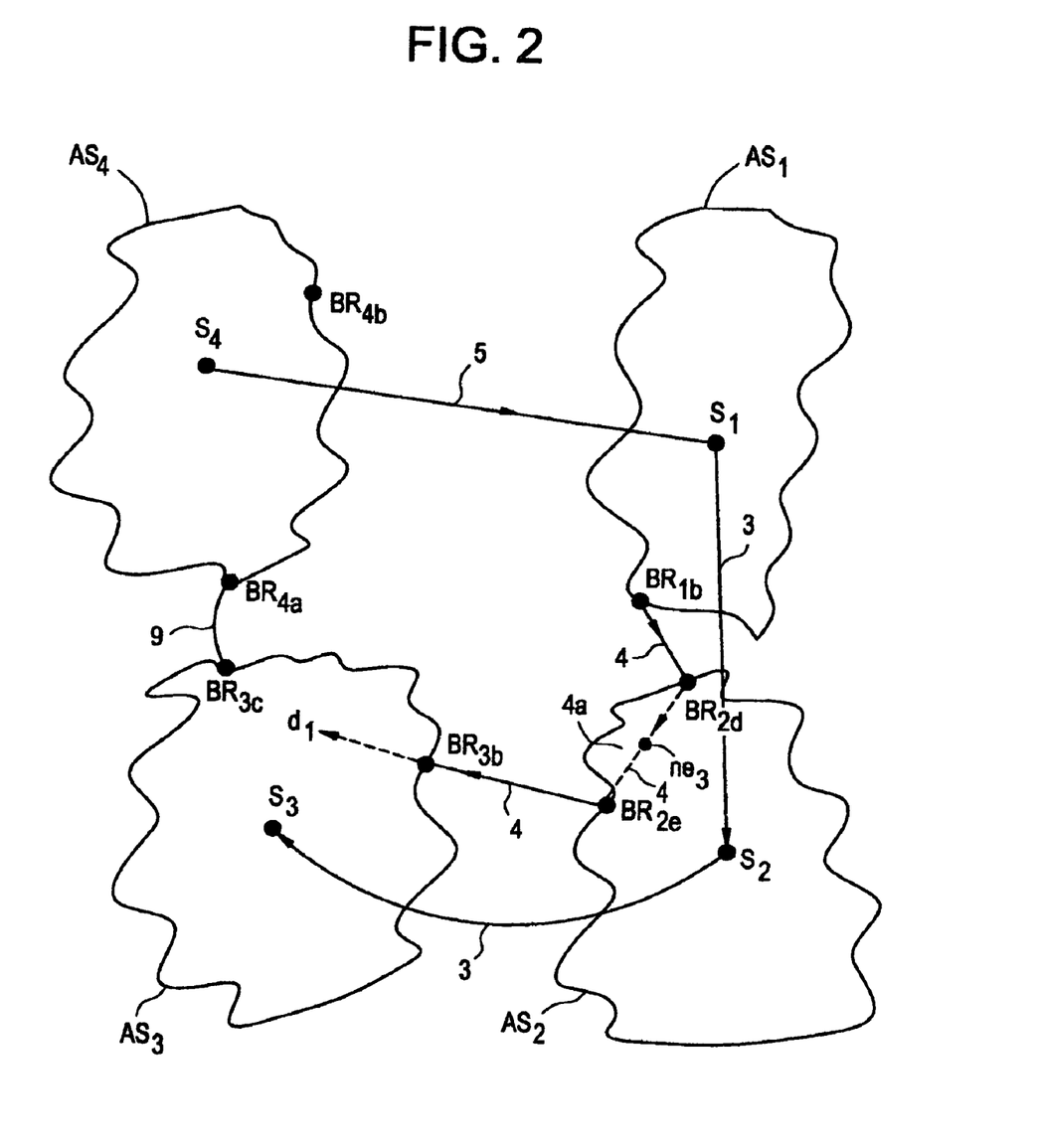
FIG. 2 depicts another simplified diagram of different domains used to illustrate additional embodiments of the present invention.
Figure 3:
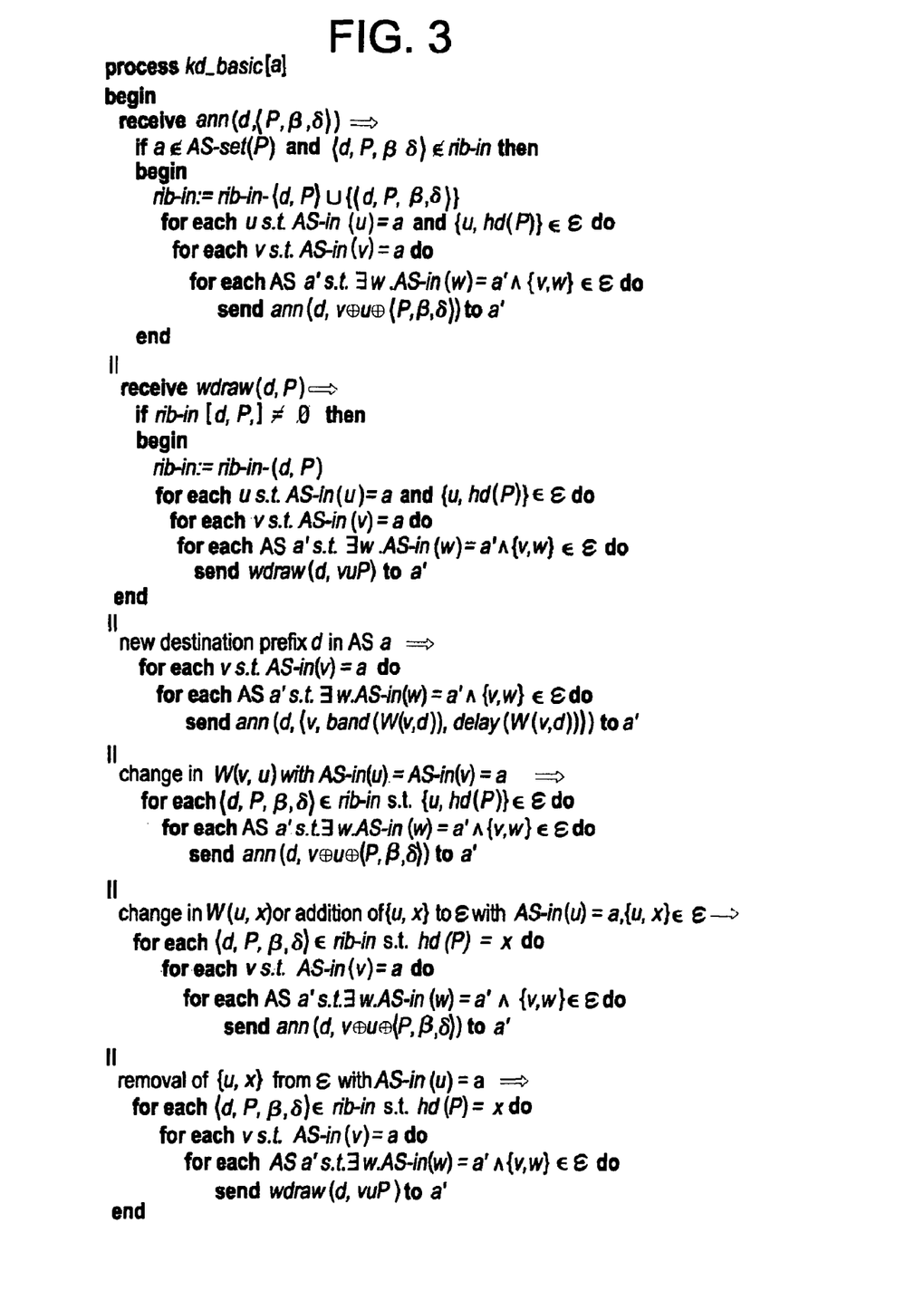
FIGS. 3 through 7 depict exemplary applications/programs which may be stored, executed and/or run in accordance with embodiments of the present invention.
Figure 4:
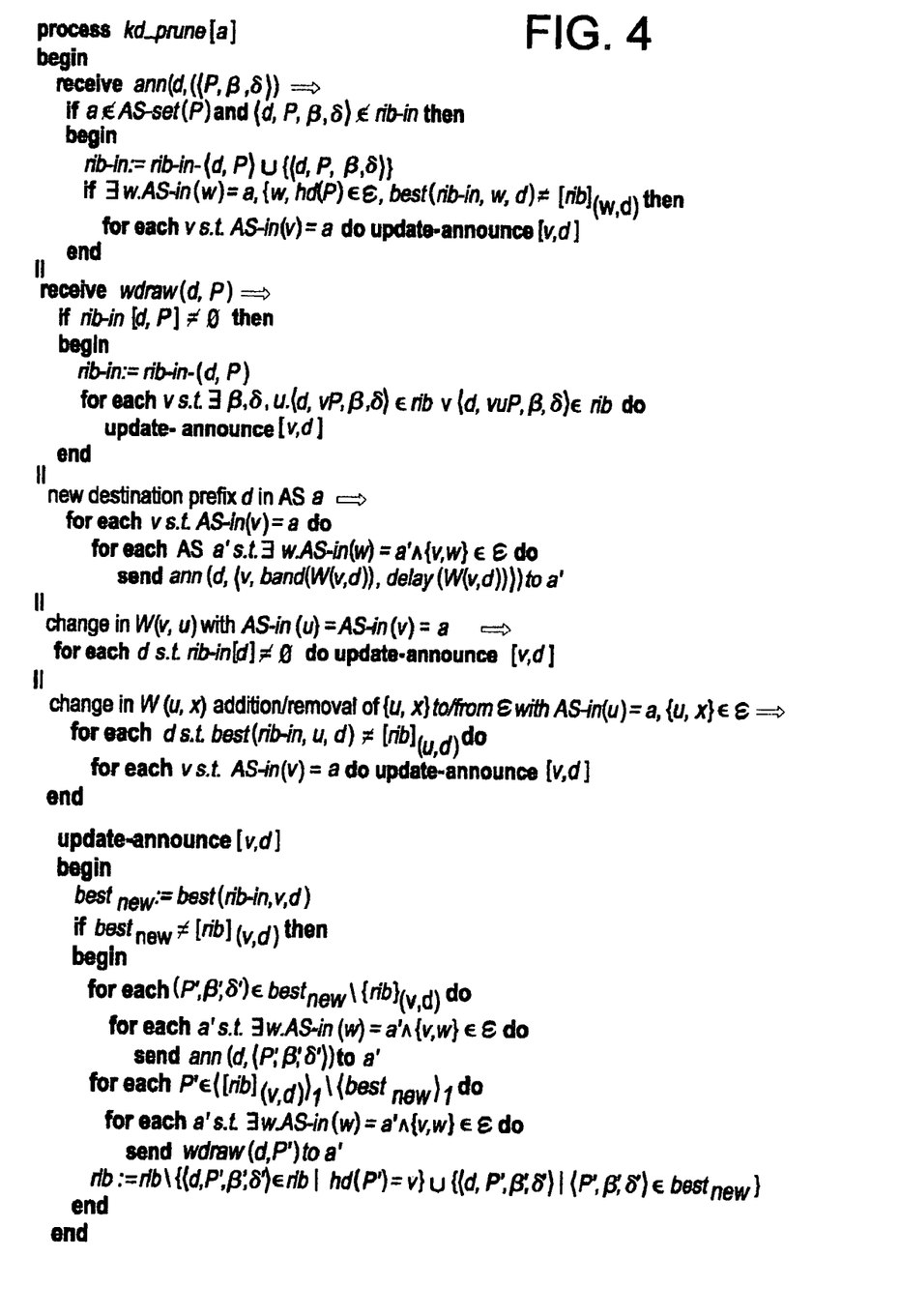
Figure 5:
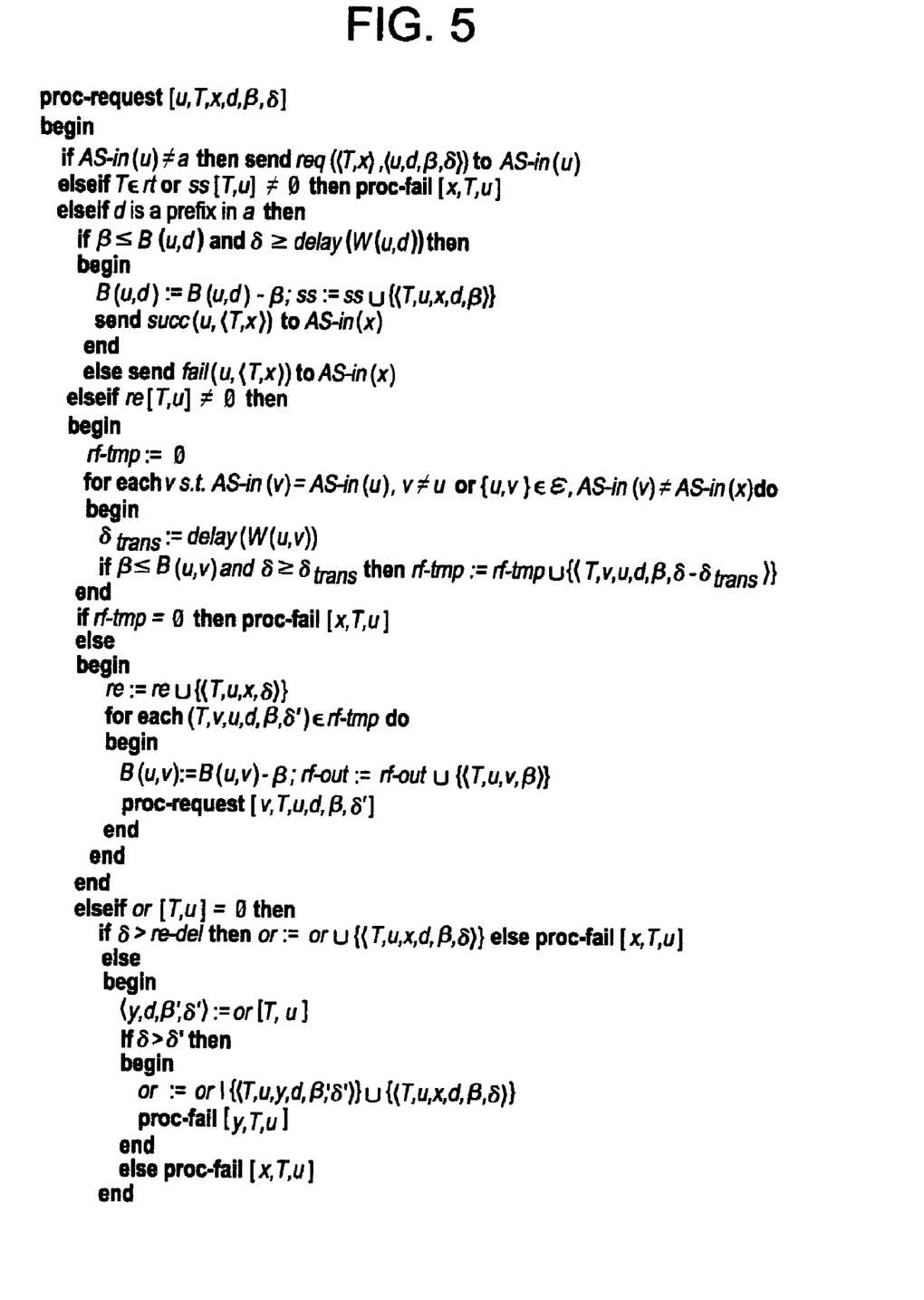
Figure 6:
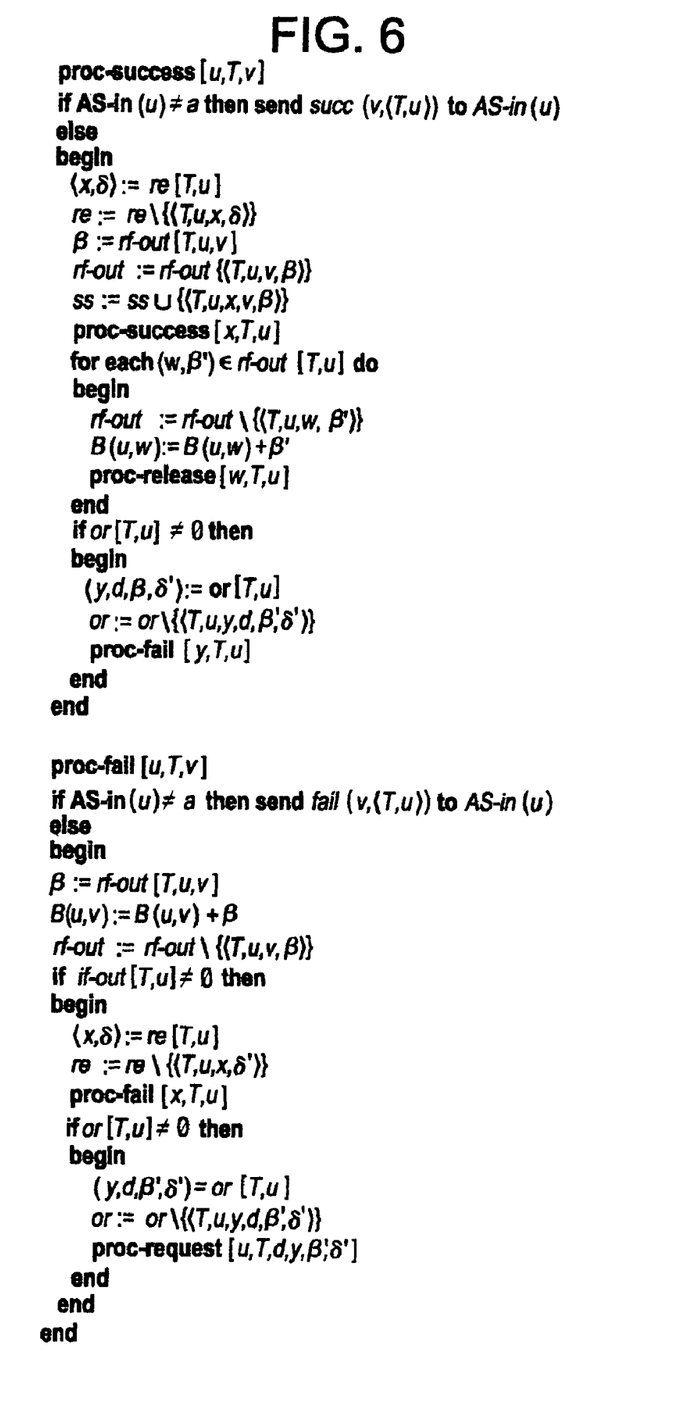
Figure 7:
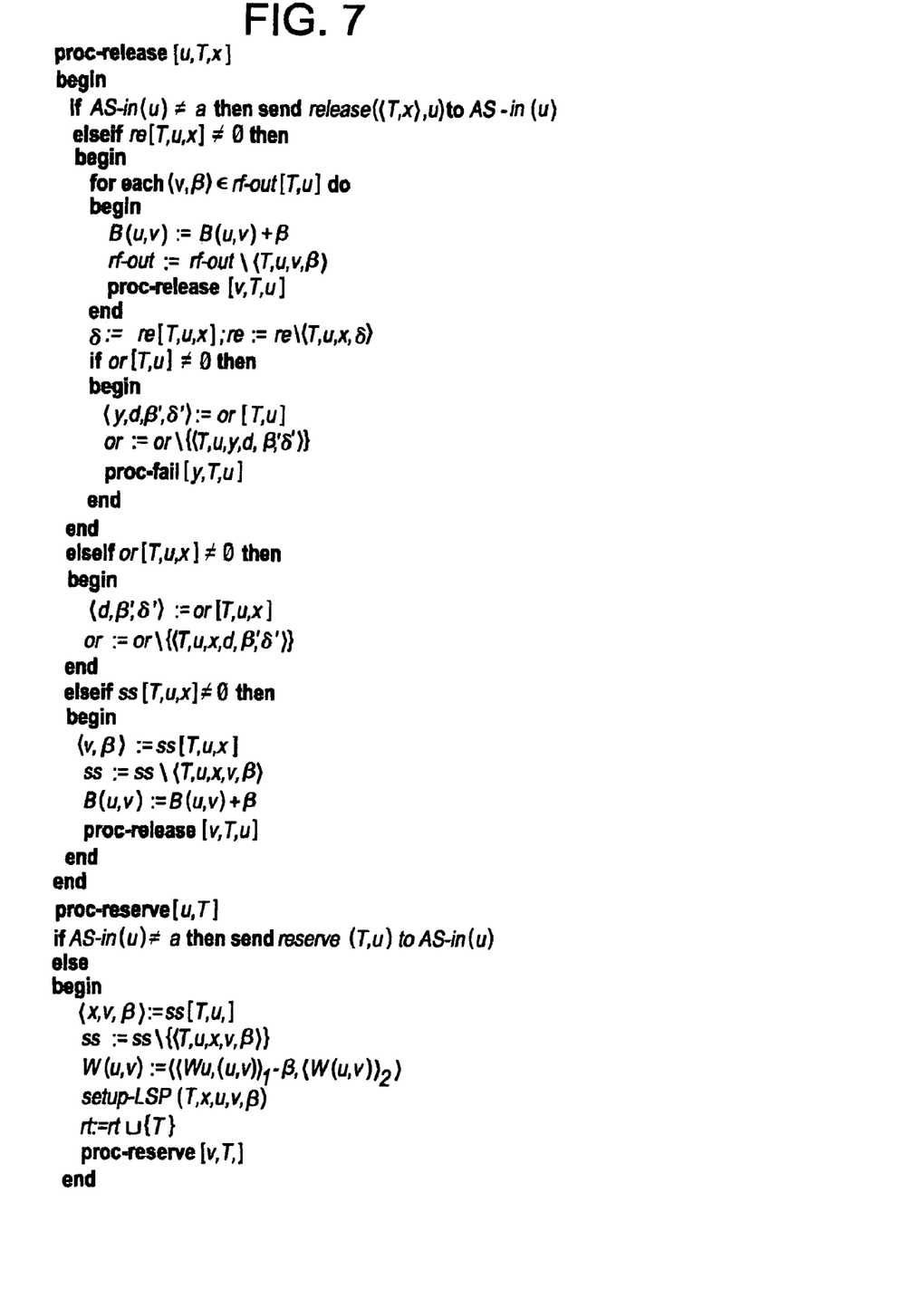

Referring now to FIG. 2, there is shown one example of such a reservation request sent via pathway 3. The request sent along pathway 3 has as its goal to reserve the required bandwidth within each AS that is included in a best path 4 to destination $d_1$ that has been identified as satisfying a trunk request. The reservation request is shown being first sent from speaker $S_1$ to speaker $S_2$ within neighboring domain, $AS_2$. Upon being received by speaker $S_2$, speaker $S_2$ is operable to reserve the required bandwidth to satisfy the original trunk request. In addition, speaker $S_2$ may be operable to relay the reservation request on to speaker $S_3$ within a third neighboring domain, $AS_3$, whereupon speaker $S_3$ also reserves the required bandwidth. In sum, the reservation request is forwarded on to each AS (i.e., each speaker within each AS) that is traversed by path 4 until it reaches destination $d_1$. In this manner, the bandwidth needed to forward information along path 4 is reserved.

We now leave the realm of trunk requests and return to a discussion of how the present invention provides service providers with a means of maintaining an accurate information base. In particular, we now present some examples of messages which may be generated and sent by the speaker, $S_1$, after its information base, and in particular its second listing, is updated with new best paths.

Assuming that the receipt of an announcement message via pathway 1 triggers an update of the second listing, the speaker $S_1$ may be operable to generate any number of messages. In one embodiment of the present invention, a withdrawal message may be generated and sent to one or more neighboring domains in order to withdraw at least a previously sent best path. That is, by sending a withdrawal message to its neighbors, the reference domain $AS_1$ is attempting to inform its neighbors that the best path information it had previously sent is no longer valid because it has now computed new best paths. To communicate these new best paths to its neighbors, in one embodiment of the present invention, the speaker $S_1$ may be operable to generate and send a path announcement message to one or more of its neighboring domains in order to provide them with at least the new, computed best paths and their associated QoS parameters. It should be understood that the best paths which are contained within an announcement message are those paths which lead from the reference domain $AS_1$ to a particular destination identified by the destination prefix within an associated announcement message. Further, as stated above, no intra-domain information is included in such a message. Using path 4 in FIG. 2 as an example, a typical message would include the sequence $BR_{1b}$, $BR_{2d}$, $BR_{2e}$ and $BR_{3b}$, omitting the intra-domain element $n_3$ and segment 4a.

Up until now, we have assumed that the reference domain $AS_1$ was the domain which was generating messages. It should be understood, however, that any one of the domains $AS_1$, $AS_2$, $AS_3$ or $AS_4$ could be a reference domain. Accordingly, each domain may send and receive messages. For example, the reference domain $AS_1$ may receive withdrawal messages from a neighboring domain, such as $AS_4$. Referring back to FIG. 2, there is shown a pathway 5 from speaker $S_4$ and $AS_4$ to speaker $S_1$ within $AS_1$. Such a message may be sent by the domain $AS_4$ in order to withdraw previously sent best paths. Such a message indicates that a previously sent best path is longer the best path from the domain $AS_4$ to a given destination, for example. In accordance with the present invention, upon receiving a withdrawal message, the speaker $S_1$ may be operable to process the message in order to determine whether a path contained in the message is contained in its information base. More specifically, because the withdrawal message is from a neighboring domain, the speaker $S_1$ is operable to process the message in order to determine whether a path in the message is contained in its first listing which relates to paths from neighboring domains. If the speaker $S_1$ determines that the previously announced best path contained in the withdrawal message is, in fact, a part of its first listing then the speaker $S_1$ may be further operable to delete the previously announced path from the listing. In this manner, the information base, and in particular the first listing of $AS_1$, is accurately maintained when changes occur within such neighboring domains.

In some cases, it may be necessary to also update the second listing when a withdrawal message is received. This is because a withdrawal of a previously identified best path by a neighboring domain may affect a previously computed best path from the reference domain as well. Therefore, in accordance with a further embodiment of the present invention, speaker $S_1$ may be further operable to compute one or more new best paths to the destination indicated in the withdrawal message from the reference domain $AS_1$, and any associated QoS parameters, upon receiving the message. Thereafter, the speaker $S_1$ may yet be further operable to update its second listing by adding the computed one or more new best paths and associated QoS parameters. In this manner, both best path listings may be updated and accurately maintained when changes occur in a neighboring domain. As with announcement messages, withdrawal messages do not contain intra-domain information.

The sending of a withdrawal message sets off a chain reaction of sorts. The first part of this reaction has just been described, mainly, where the reference domain computes new best paths from its neighboring domains and from itself. As the reader may have guessed, the next step in a chain reaction is for the reference domain, $AS_1$, to once again inform its neighboring domains of the changes it has made to its own (i.e., second) best path listing. Similar to before, the reference domain $AS_1$, and in particular, speaker $S_1$, communicates these changes by sending either a path announcement message or a withdrawal message to its neighboring domains.

More specifically, when the speaker $S_1$ sends a path announcement message to one or more of its neighboring domains, the message contains the new paths and associated QoS parameters which were computed after receipt of a withdrawal message. At substantially the same time, or within a short time thereafter, the speaker $S_1$ may be operable to forward a withdrawal message to one or more of its neighboring domains in order to withdraw a previously sent best path and associated QoS parameters which were computed prior to the receipt of a withdrawal message. Thus, as indicated above it can been seen that a change in one domain triggers a change in its neighbor which in turn may set off a chain reaction of changes from one domain to another. To reiterate, the messages exchanged between domains do not contain intra-domain information.

Sometimes changes to a domain occur from within. That is, changes may occur to the reference domain $AS_1$ without it first receiving an announcement, withdrawal or similar message. For example, new network elements (e.g., routers) may be added to a domain. When this occurs, the domain typically provides each new network element with a network address. In general, anytime an entity or element is added to the domain and the entity/element desires to be reached by other elements, etc., it must be provided with an address and the other elements must know how to reach it. Realizing this, the present invention provides for methods and devices for accurately maintaining an information base of a domain when such changes occur. For example, referring again to FIG. 1, there is shown network elements 6 and 7 which, for present purposes, we will assume have just been added into domain $AS_4$. In accordance with the present invention, a network management device 8 or the like is operable to detect one or more new elements, such as elements 6 and 7, within domain $AS_4$. Upon detecting each element, the device 8 may be operable to assign a destination prefix and compute a path and associated QoS parameters to each detected element 6, 7. Thereafter, element 6 is operable to inform the speaker $S_4$ of such information. Upon receipt of this information, speaker $S_4$ may be further operable to send a path announcement message corresponding to the addition of each new element to one or more of its neighboring domains. Each announcement message contains at least the destination prefix of each new element 6, 7, a computed path including inter-domain elements and the QoS parameters associated with the path. In this manner, changes to a given domain are communicated to its neighbors in order to allow its neighbors to accurately maintain their information bases.

The addition of new elements, such as elements 6 and 7, are not the only changes which may occur to a domain. For example, sometimes just the QoS characteristics of a particular link within a domain may change. More specifically, sometimes the delay or available bandwidth associated with a given link within a domain may change. When this occurs, the present invention provides for methods and devices for updating an information base of routes in order to maintain the accuracy of such an information base.

For example, assuming that a change to a QoS characteristic of a link within the reference domain $AS_4$ has changed, the device 8 may be operable to detect such a change and to communicate these changes to speaker $S_4$. Upon receiving these changes, speaker $S_4$ may be further operable to update a best path listing which is made a part of its information base by adding the new QoS characteristics. Because the link (whose QoS characteristics have changed) is within reference domain $AS_4$, the best path listing which would be updated is the second listing in reference domain $AS_4$.

It may occur, however, that a QoS characteristic of a link on the edge of a domain may change. For example, a link 9 in FIG. 2 that includes a Border Router $BR_{3c}$ in domain $AS_3$ and a Border Router $BR_{4a}$ in $AS_4$. In accordance with a further embodiment of the present invention, the speaker $S_4$ (for example) may be operable to detect the change in the QoS characteristic of link 9. Upon detection of such a change, the speaker $S_4$ may compute one or more new best paths/QoS parameters based on such a change and may update its best path listing (e.g., the second listing) by adding the one or more computed paths and associated QoS parameters. Consistent with our discussion above, each time a change is made to the second listing or in general to the information base of a domain, this change must be communicated to the domain's neighbors so that the information base of these neighboring domains may remain accurate. To provide for this, the speaker $S_4$ may be further operable to send a path announcement message to one or more of its neighboring domains. The message comprises at least the computed best path, that includes inter-domain information and QoS parameters. In parallel, the speaker $S_4$ may also send a path withdrawal message to one or more of its neighboring domains in order to withdraw at least a previously sent best path which is no longer a best path due to a change in the QoS characteristics of link 9.

We now turn our attention to the second set of methodologies and devices provided by the present invention, namely OD-AQUA. As mentioned briefly at the very beginning of our discussion, while KD-AQUA relies on an accurate information base in order to satisfy trunk requests, OD-AQUA does not. Further, OD-AQUA does not disclose intra- or inter-domain information.

Referring again to FIG. 1, we will assume that a trunk request is once again received by the speaker $S_1$ along pathway 1. Unlike before, however, upon receipt of the trunk request, the speaker $S_1$ does not make use of an information base to identify one or more paths in order to satisfy the trunk request. More specifically, the speaker $S_1$ does not search or consult an information base before sending a message to neighboring domains. Instead, in accordance with OD-AQUA methodologies of the present invention, the speaker $S_1$ may be operable to assume initially that the received trunk request is associated with a destination which is outside of its reference domain $AS_1$. Sometimes this may not be the case. If not, then the speaker $S_1$ will not call upon the OD-AQUA methodologies (or KD-AQUA) of the present invention. Assuming, however, that the destination prefix contained in the received trunk request is for a destination which falls outside the reference domain $AS_1$, then the OD-AQUA methodologies of the present invention may be accessed by speaker $S_1$ and the like.

In accordance with the present invention, upon receiving a trunk request, the speaker $S_1$ is operable to send a path request message, to one or more neighboring domains, such as $AS_2$, in order to identify one or more paths from such domains to the destination which satisfies the trunk request. This path request message does not contain intra- or inter-domain information. Instead, it contains the destination from the trunk request and adjusted QoS requirements which must be satisfied.

In more detail, the speaker $S_1$ is operable to first determine the delay and bandwidth requirements that are associated with a peering link between its domain $AS_1$ and $AS_2$, such as the link between Border Router $BR_{1a}$ and Border Router $BR_{2a}$. Upon calculating these requirements, the speaker $S_1$ is further operable to subtract (or, in general adjust) these requirements from the original requirements contained in the trunk request. The resulting requirements may again be referred to as next delay and bandwidth requirements. It is these next requirements that make up the adjusted QoS requirements that are forwarded on to $AS_2$. Some exemplary values may further help the reader understand this last point.

For example, if the delay requirement in the original trunk request is 5 milliseconds before the trunk request reaches $AS_1$ and it takes 0.2 milliseconds for the trunk request to traverse the link between Border Router $BR_{1a}$ and Border Router$_{2a}$, then the resulting delay requirement at border router $BR_{2a}$ is 4.8 and not 5.0 milliseconds. In general, it can be said that the speaker $S_1$ may be operable to compute a next delay value (e.g., 4.8 milliseconds) by subtracting a delay value that is associated with the peering link (e.g., 0.20 milliseconds) from the required delay value that was contained in the original trunk request (i.e., part of the QoS requirements of such a request).

Continuing, $AS_2$ (or any other neighboring domain that receives a similar message) may respond to a path request by forwarding a message back to the reference domain $AS_1$. The message may take the form of a "success" message or a "failure" message. A success message is sent to indicate that a domain can satisfy a trunk request sent by the speaker $S_1$, while a failure message is sent to indicate that a domain cannot satisfy the trunk request. In either case, the message does not contain inter- or intra-domain information. Instead, all that the $AS_1$ knows is that another AS can, or cannot, satisfy the request.

Assuming that $AS_2$ (or at least one other neighboring domain) sends a success message to the speaker $S_1$, the speaker $S_1$ may then be further operable to send a reservation request to $AS_2$ (or the neighboring domain which responded or forwarded the success message). Similarly, the speaker $S_1$ may send an additional message to $AS_2$ (i.e., the same domain) further requesting that the domain reserve sufficient bandwidth to satisfy the trunk request. In this manner, bandwidth may be said to be "guaranteed". After it has identified at least one neighboring domain that can satisfy the original trunk request, speaker $S_1$, in parallel with a reservation request, may also be operable to send a release message to those neighboring domains that cannot satisfy the trunk requests/path request message (i.e., those domains which responded with a failure message) or have not yet responded. Again, none of the messages contain inter- or intra-domain information.

Sometimes, however, none of the neighboring domains can satisfy a trunk request/path request message. In such a case, all of the neighboring domains will respond to a path request message with a failure message. In such a scenario, the speaker $S_1$ may be operable to, thereafter, send a "trunk request can not be met" message or the like to the domain which initially generated the trunk request that was received via pathway 1. In this manner, it can be said that OD-AQUA includes a "guaranteed" termination event if a trunk request cannot be met.

For the sake of completeness, FIGS. 3 through 7 depict exemplary applications/programs which may be stored, executed and/or run by speakers or other devices in accordance with embodiments of the present invention.

The description above has attempted to set forth some examples of KD and OD-AQUA methods and devices provided by the present invention. The true scope of the present invention, however, is better represented by the claims which follow.

We claim:

1. A method for computing quality-assured, inter-domain paths comprising:
    receiving an announcement message comprising a destination prefix, quality-of-service ("QoS") parameters and path information related to a destination indicated by the prefix;

processing the announcement message to determine whether a path in the path information traverses a reference domain and to determine whether the path is already stored in a first, best path listing; and adding the path contained in the path information into the first listing when the path does not traverse the reference domain or when the path is not contained in the first path listing.

2. The method as in claim 1 wherein the first listing comprises best paths from neighboring domains to the destination and associated QoS parameters.

3. The method as in claim 1 further comprising:

computing one or more best paths to the destination from the reference domain and associated QoS parameters based on the received message; and updating a second, best past listing by adding the computed best paths and associated QoS parameters.

4. The method as in claim 3 wherein the second listing comprises paths and associated QoS parameters from the reference domain to the destination.

5. The method as in claim 3 further comprising sending a path announcement message to one or more neighboring domains to provide them with at least the computed best paths and associated QoS parameters, wherein the message contains inter-domain, but not intra-domain, information.

6. The method as in claim 3 further comprising:

sending a path withdrawal message to one or more neighboring domains to withdraw at least a previously sent best path, wherein the message contains inter-domain, but not intra-domain, information.

7. The method as in claim 1 further comprising:

detecting one or more new elements; and sending a path announcement message, for each new element, to one or more neighboring domains, the message comprising inter-domain, but not intra-domain, information.

8. The method as in claim 1 further comprising:

detecting a change in a QoS characteristic of a link; and sending a path announcement message to one or more neighboring domains, the message comprising inter-domain, but not intra-domain, information related to QoS parameters computed upon detection of the change.

9. The method as in claim 1 further comprising:

receiving a trunk request, comprising at least a destination prefix and QoS requirements, at a reference domain;

sending a path request message to one or more neighboring domains to identify one or more paths that satisfy the trunk request, the request message containing the prefix and adjusted QoS requirements but not intra- or inter-domain information; and receiving one or more messages from the one or more neighboring domains in response to the path request message, each received message indicating whether or not a given domain can satisfy the trunk request, but not indicating intra- or inter-domain information.

10. The method as in claim 9 further comprising:

sending a reservation request to a neighboring domain in response to the receipt of a message from such a domain that the neighboring domain can satisfy the trunk request.

11. The method as in claim 9 further comprising:

sending a release message to those neighboring domains that can not satisfy the trunk request.

12. The method as in claim 9 further comprising:

sending a message to the domain that originated the trunk request when none of the neighboring domains can satisfy the trunk request.

13. The method as in claim 9 wherein the adjusted QoS requirements include a next delay value, the value being computed by:

subtracting a delay value associated with a peering link from the reference domain to a neighboring domain from a delay value that is part of the trunk request.

14. A device for computing quality-assured, inter-domain paths comprising a computer readable medium for storing instructions operable to:

receive an announcement message comprising a destination prefix, quality-of-service ("QoS") parameters and path information related to a destination indicated by the prefix;

process the announcement message to determine whether a path in the path information traverses a reference domain and to determine whether the path is already stored in a first, best path listing; and add the path contained in the path information into the first listing when the path does not traverse the reference domain or when the path is not contained in the first path listing.

15. The device as in claim 14 wherein the first listing comprises best paths from neighboring domains to the destination and associated QoS parameters.

16. The device as in claim 14 wherein the instructions further comprise instructions operable to:

compute one or more best paths to the destination from the reference domain and associated QoS parameters based on the received message; and update a second, best past listing by adding the computed best paths and associated QoS parameters.

17. The device as in claim 16 wherein the second listing comprises paths and associated QoS parameters from the reference domain to the destination.

18. The device as in claim 16 wherein the instructions further comprise instructions operable to send a path announcement message to one or more neighboring domains to provide them with at least the computed best paths and associated QoS parameters, wherein the message contains inter-domain, but not intra-domain, information.

19. The device as in claim 16 wherein the instructions further comprise instructions operable to:

send a path withdrawal message to one or more neighboring domains to withdraw at least a previously sent best path, wherein the message contains inter-domain, but not intra-domain, information.

20. The device as in claim 14 wherein the instructions further comprise instructions operable to:

receive a trunk request comprising at least a destination prefix and QoS requirements;

search an information base to identify one or more paths that satisfies the trunk request; and forward a reservation request, for each identified path, to each domain along the identified path to reserve bandwidth sufficient to satisfy the request, wherein the message contains inter-domain, but not intra-domain, information.

21. The device as in claim 20 wherein the QoS requirements include a delay value and a bandwidth value.

22. The device as in claim 14 wherein the instructions further comprise instructions operable to:
   detect one or more new elements; and
   send a path announcement message, for each new element, to one or more neighboring domains, the message comprising inter-domain, but not intra-domain, information.

23. The device as in claim 14 wherein the instructions further comprise instructions operable to:
   detect a change in a QoS characteristic of a link; and
   send a path announcement message to one or more neighboring domains, the message comprising inter-domain, but not intra-domain, information related to QoS parameters computed upon detection of the change.

* * * * *